US012779409B2

(12) United States Patent
Kim et al.

(10) Patent No.: US 12,779,409 B2
(45) Date of Patent: Nov. 3, 2026

(54) APPARATUS AND METHOD FOR PREPARATION OF ELECTRODE SLURRY

(71) Applicant: LG ENERGY SOLUTION, LTD., Seoul (KR)

(72) Inventors: Yonghan Kim, Daejeon (KR); Takashi Takeuchi, Daejeon (KR); Hyeon Min Ko, Daejeon (KR); Sora Lee, Daejeon (KR); Seungmi Han, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 554 days.

(21) Appl. No.: 18/272,892

(22) PCT Filed: Oct. 28, 2022

(86) PCT No.: PCT/KR2022/016744
§ 371 (c)(1),
(2) Date: Jul. 18, 2023

(87) PCT Pub. No.: WO2023/075521
PCT Pub. Date: May 4, 2023

(65) Prior Publication Data

US 2024/0116011 A1 Apr. 11, 2024

(30) Foreign Application Priority Data

Oct. 28, 2021 (KR) ........................ 10-2021-0145344

(51) Int. Cl.
*B01F 23/00* (2022.01)
*B01F 23/50* (2022.01)
(Continued)

(52) U.S. Cl.
CPC ........ *B01F 23/565* (2022.01); *B01F 35/2117* (2022.01); *B01F 35/881* (2022.01);
(Continued)

(58) Field of Classification Search
CPC .. B01F 23/565; B01F 35/881; B01F 2101/59; B01F 35/90; H01M 4/04
See application file for complete search history.

(56) References Cited

U.S. PATENT DOCUMENTS

| | | | |
|---|---|---|---|
| 2008/0096109 | A1 | 4/2008 | Fukumine et al. |
| 2016/0084752 | A1 | 3/2016 | Onoda |

(Continued)

FOREIGN PATENT DOCUMENTS

| | | | |
|---|---|---|---|
| CN | 203389529 | U | 1/2014 |
| CN | 105445205 | A | 3/2016 |

(Continued)

OTHER PUBLICATIONS

Lim KR20080095463 Machine Translation (Year: 2008).*
(Continued)

*Primary Examiner* — Anshu Bhatia
(74) *Attorney, Agent, or Firm* — Birch, Stewart, Kolasch & Birch, LLP

(57) ABSTRACT

The present invention relates to an apparatus for manufacturing slurry for an electrode, the apparatus including a mixing part configured to manufacture slurry for an electrode by receiving and mixing an electrode active material, a conductive material, a binder, and a solvent, a flow path configured to sample the slurry for an electrode from the mixing part, a weight measurement part configured to measure a weight of a sample of the slurry for an electrode, a washing part configured to wash an interior of the weight measurement part, and a gas discharge part configured to circulate air in the weight measurement part.

15 Claims, 4 Drawing Sheets

(51) Int. Cl.

| | |
|---|---|
| ***B01F 35/21*** | (2022.01) |
| ***B01F 35/88*** | (2022.01) |
| ***B01F 35/90*** | (2022.01) |
| ***H01M 4/04*** | (2006.01) |
| *B01F 101/59* | (2022.01) |

(52) U.S. Cl.

CPC ............... *B01F 35/90* (2022.01); *H01M 4/04* (2013.01); *B01F 2101/59* (2022.01)

(56) References Cited

U.S. PATENT DOCUMENTS

| | | | |
|---|---|---|---|
| 2018/0076479 | A1 | 3/2018 | Kawasaki et al. |
| 2021/0131929 | A1 | 5/2021 | Levy et al. |

FOREIGN PATENT DOCUMENTS

| | | | |
|---|---|---|---|
| CN | 213422902 | U | 6/2021 |
| EP | 3 495 786 | A1 | 6/2019 |
| JP | 7-103865 | A | 4/1995 |
| JP | 7-103866 | A | 4/1995 |
| JP | 7-294394 | A | 11/1995 |
| JP | 2001-60459 | A | 3/2001 |
| JP | 2002-348119 | A | 12/2002 |
| JP | 2003-10890 | A | 1/2003 |
| JP | 2006-107959 | A | 4/2006 |
| JP | 2007-5238 | A | 1/2007 |
| JP | 2009-154482 | A | 7/2009 |
| JP | 2017-147188 | A | 8/2017 |
| JP | 2018-60703 | A | 4/2018 |
| JP | 2018-67433 | A | 4/2018 |
| JP | 2020-24853 | A | 2/2020 |
| KR | 10-2008-0095463 | A | 10/2008 |
| KR | 10-2015-0049589 | A | 5/2015 |
| KR | 10-1856483 | B1 | 5/2018 |
| KR | 10-2019-0086890 | A | 7/2019 |
| KR | 10-2069461 | B1 | 2/2020 |
| WO | WO 2016/152876 | A1 | 9/2016 |

OTHER PUBLICATIONS

Wantanabe JP2009154482A Machine Translation (Year: 2009).*

Korean Office Action for Korean Application No. 10-2021-0145344, dated May 20, 2025, with English translation.

Japanese Office Action for Japanese Application No. 2023-543143, dated Aug. 6, 2024, with English translation.

Japanese Office Action for Japanese Application No. 2023-543143, dated Aug. 5, 2025, with English translation.

International Search Report (PCT/ISA/210) issued in PCT/KR2022/016744, dated Feb. 16, 2023.

Extended European Search Report for European Application No. 22887716.3, dated Jul. 5, 2024.

Chinese Office Action and Search Report for Chinese Application No. 202280012332.4, dated Apr. 27, 2026, with English translation of the Office Action.

* cited by examiner

[FIG. 1]
Related Art
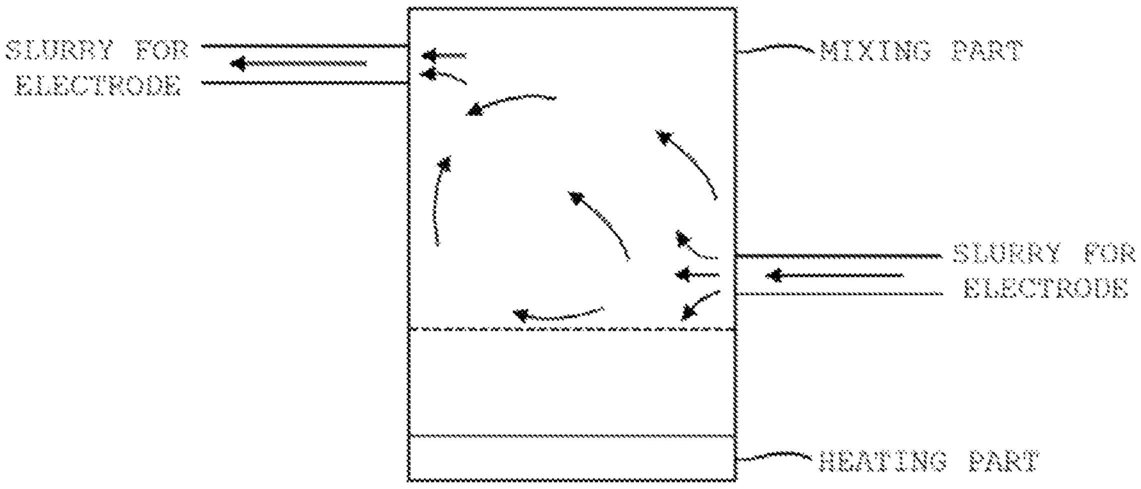

[FIG. 2]
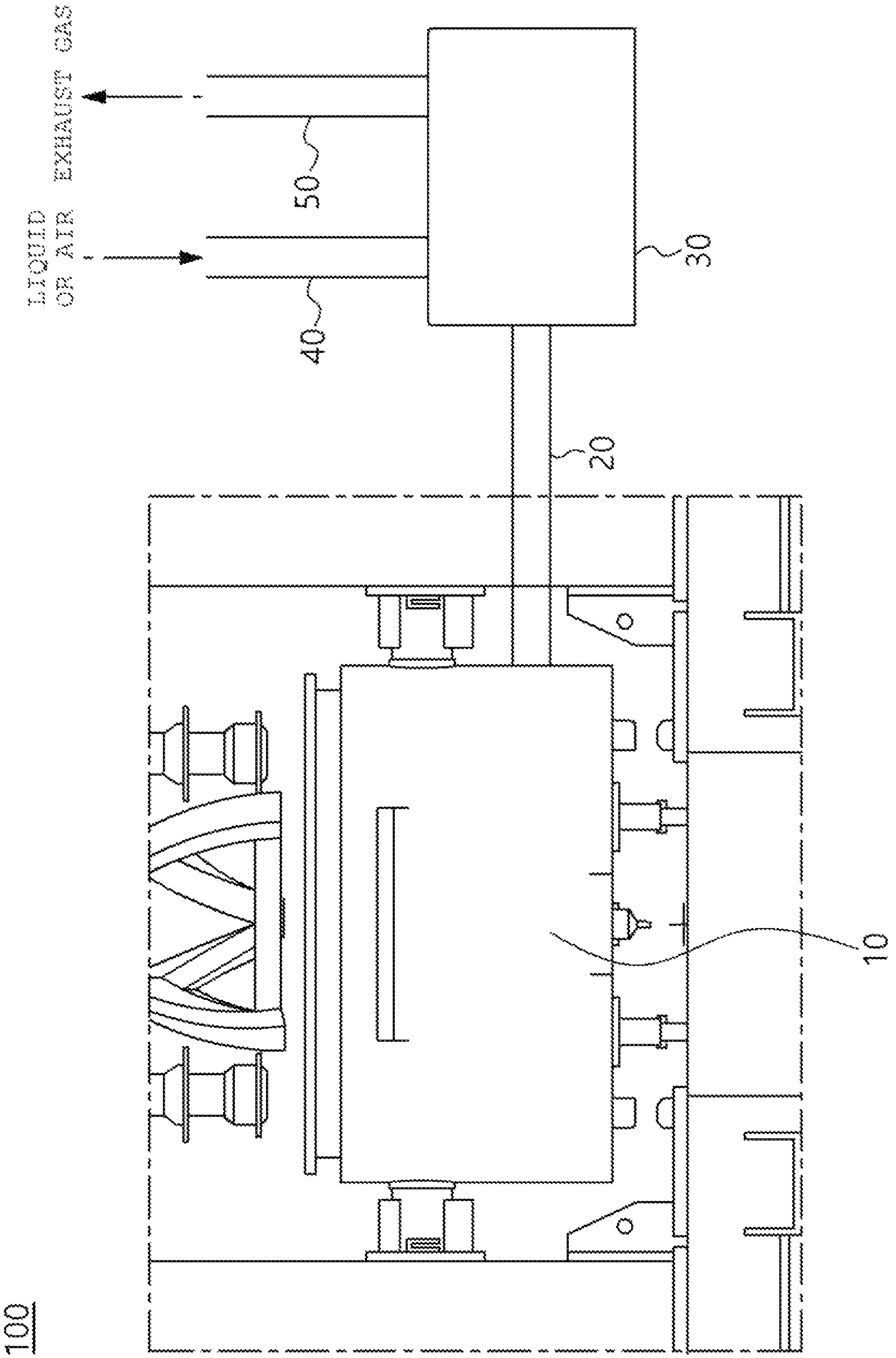

[FIG. 3]
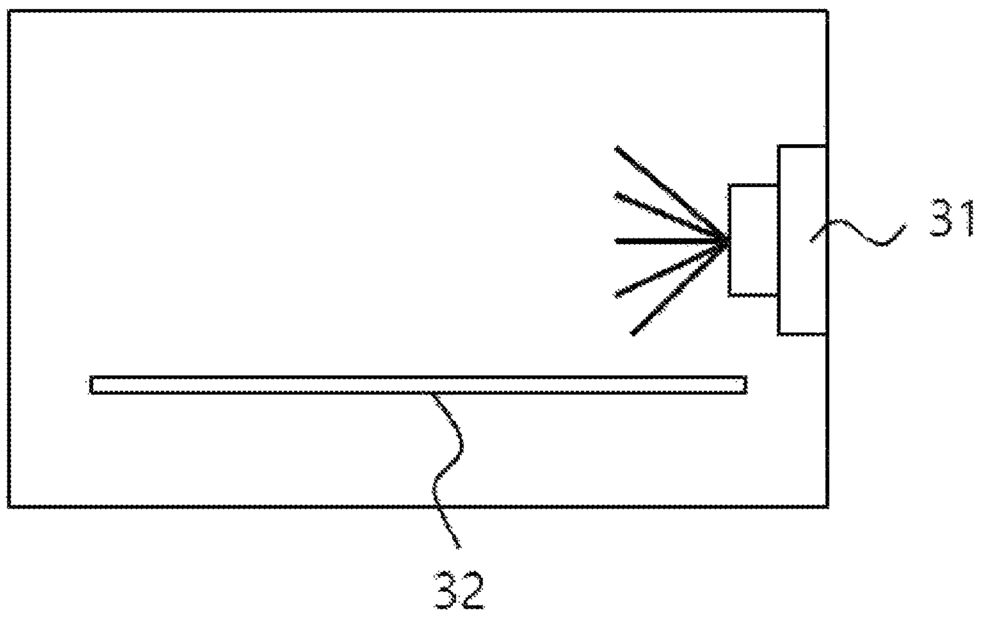

[FIG. 4]
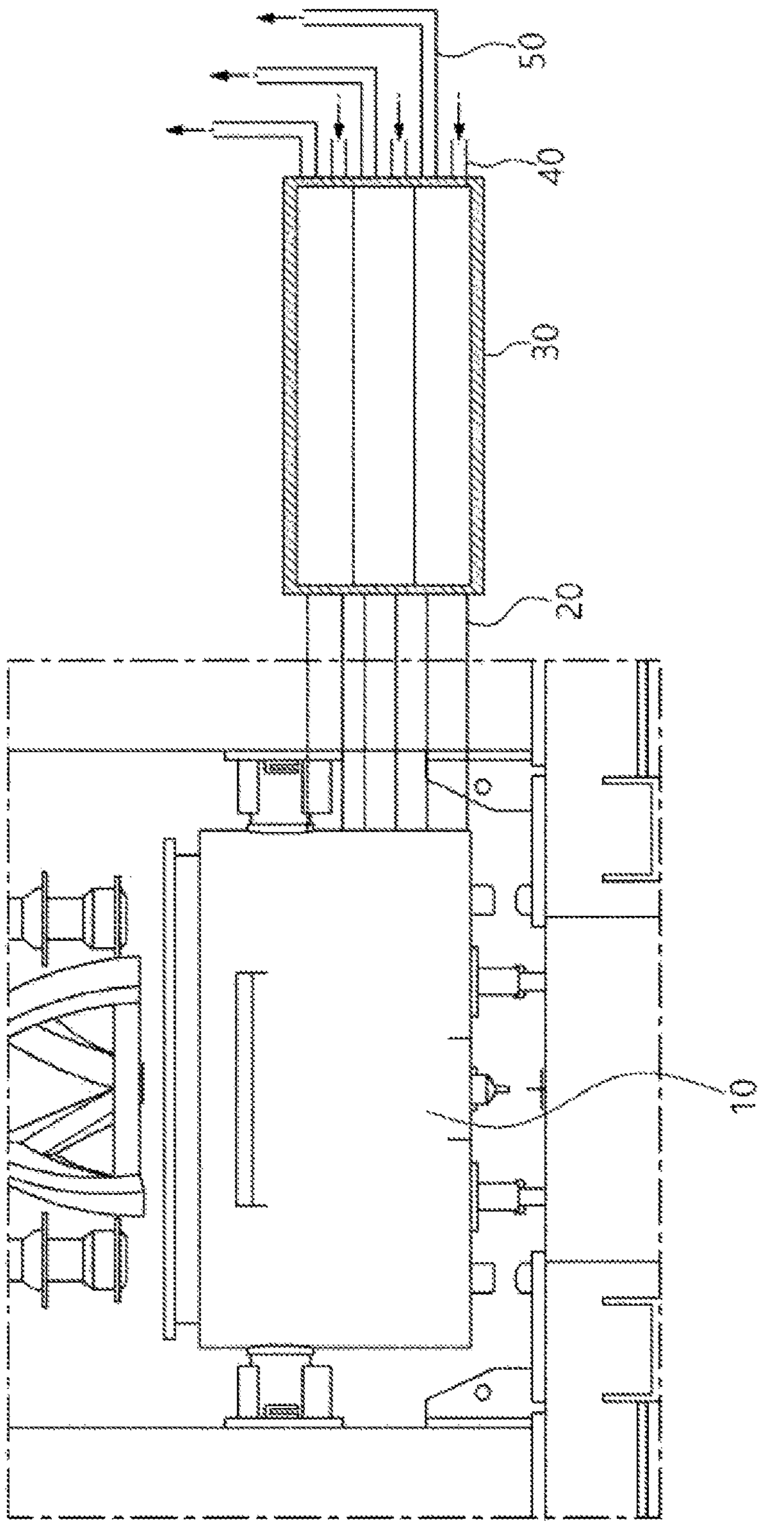

APPARATUS AND METHOD FOR PREPARATION OF ELECTRODE SLURRY

TECHNICAL FIELD

This application claims priority to and the benefit of Korean Patent Application No. 10-2021-0145344 filed with the Korean Intellectual Property Office on Oct. 28, 2021, the entire contents of which are incorporated herein by reference.

The present invention relates to an apparatus and method for manufacturing slurry for an electrode. Specifically, the present invention relates to an apparatus and method for manufacturing slurry for an electrode, which are capable of inspecting, in real time, a solid content contained in slurry for an electrode and quality of the slurry for an electrode.

BACKGROUND ART

Unlike primary batteries, secondary batteries may be rechargeable and have small scales and high capacities. Recently, research and development have been actively conducted on secondary batteries. As development of technologies and demands for mobile devices are increased, there is a rapidly increasing demand for rechargeable batteries as energy sources.

The secondary batteries are classified into coin batteries, cylindrical batteries, angular batteries, and pouch-type batteries depending on shapes of battery casings. In the secondary battery, an electrode assembly mounted in the battery casing is a power generation element that has a structure made by stacking electrodes and separators and may be charged and discharged.

The electrode assemblies may be approximately classified into a Jelly-roll-type electrode assembly made by interposing a separator between sheet-shaped positive and negative electrodes coated with active materials and winding the stack, a stack-type electrode assembly made by sequentially stacking a plurality of positive and negative electrodes in a state in which separators are interposed between the plurality of positive and negative electrodes, and a stack/folding-type electrode assembly made by winding stack-type unit cells by using long separation films.

The electrode is made by coating an electrode current collector with electrode slurry. However, there is a problem in that the performance and lifespan of the battery are degraded by moisture remaining in the electrode slurry.

Therefore, there is a need for an apparatus for manufacturing slurry for an electrode, which is capable of measuring, in real time, moisture remaining in the electrode slurry and preventing a deterioration in performance and lifespan of the battery.

DETAILED DESCRIPTION OF THE INVENTION

Technical Problem

The present invention has been made in an effort to solve the above-mentioned problems, and an object of the present invention is to provide an apparatus and method for manufacturing slurry for an electrode, which are capable of measuring and adjusting, in real time, a moisture content or solid content contained in slurry for an electrode before the slurry for an electrode is supplied to a subsequent process after the slurry for an electrode is manufactured.

Technical Solution

One embodiment of the present specification provides an apparatus for manufacturing a slurry for an electrode, the apparatus including: a mixer configured to mix an electrode active material, a conductive material, a binder, and a solvent to form the slurry; a flow path configured to sample the slurry from the mixer to provide a sample; a weigher configured to measure a weight of the sample; a washer configured to wash an interior of the weigher; and a gas discharger configured to circulate air in the weigher.

In the embodiment of the present specification, the weigher may include a dryer configured to dry the sample by supplying heat to the sample.

In the embodiment of the present specification, the flow path may be provided as one or more flow paths in accordance with heights of the mixer, and each of the flow paths may move a corresponding sample of the slurry to the weigher.

Another embodiment of the present specification provides a method of manufacturing a slurry for an electrode, the method including: preparing the slurry by mixing an electrode active material, a conductive material, a binder, and a solvent; sampling the slurry to obtain a sample; measuring a weight of the sample by a weigher; and removing the sample from the weigher; and washing the weigher.

Advantageous Effects

According to the apparatus and method for manufacturing slurry for an electrode according to the embodiment of the present invention, it is possible to control the slurry for an electrode and the quality of the battery by measuring or adjusting, in real time, the moisture content or solid content contained in the slurry for an electrode before the slurry for an electrode is supplied to a subsequent process after the slurry for an electrode is manufactured.

BRIEF DESCRIPTION OF DRAWINGS

FIG. 1 is a cross-sectional view illustrating an electrode slurry manufacturing apparatus in the related art.

FIG. 2 is a side view illustrating an apparatus for manufacturing slurry for an electrode according to the embodiment of the present invention.

FIG. 3 is a cross-sectional view illustrating a weight measurement part according to the embodiment of the present invention.

FIG. 4 is a side view illustrating an apparatus for manufacturing slurry for an electrode according to another embodiment of the present invention.

EXPLANATION OF REFERENCE NUMERALS AND SYMBOLS

100: Apparatus for manufacturing slurry for electrode
10: Mixing part
20: Flow path
30: Weight measurement part
31: Drying part
32: Plate
40: Washing part
50: Gas discharge part

BEST MODE

Hereinafter, the present invention will be described in detail with reference to the drawings. However, the drawings are intended to illustratively describe the present invention, and the scope of the present invention is not limited by the drawings.

FIG. 2 is a side view illustrating an apparatus 100 for manufacturing slurry for an electrode according to an embodiment of the present invention.

The apparatus 100 for manufacturing slurry for an electrode may include a mixing part 10, a flow path 20, a weight measurement part 30, a washing part 40, and a gas discharge part 50.

The mixing part 10 may manufacture the slurry for an electrode by mixing an electrode active material, a conductive material, a binder, and a solvent. The electrode active material may include any one of a positive electrode active material and a negative electrode active material, and the positive electrode active material may include lithium ions. The negative electrode active material may reversibly absorb/discharge the lithium ions emitted from the positive electrode and allow an electric current to flow through an external circuit. The negative electrode active material may include graphite and silicon.

The conductive material may be used to increase conductivity of the electrode active material, and the solvent may be used to adjust a viscosity of the slurry for an electrode.

The binder may be used to physically stabilize the electrode. The binder may be used to increase a force for bonding the electrode active material and the conductive material to a sheet (current collector), e.g., an aluminum sheet or a copper sheet that is coated with the slurry for an electrode during a subsequent process.

Various electrode active materials, various conductive materials, various binders, and various solvents, which may be used in the technical field, may be used as the electrode active material, the conductive material, the binder, and the solvent. The electrode active material, the conductive material, the binder, and the solvent are not particularly limited in terms of types thereof.

Further, the mixing part 10 may include: a main body (not illustrated) configured to receive and store the electrode active material, the conductive material, the binder, and the solvent; and an agitator (not illustrated) configured to agitate the electrode active material, the conductive material, the binder, and the solvent.

Mixing devices with various shapes, which may be used in the technical field, may be used as the mixing part 10, and the shape of the mixing part 10 is not particularly limited.

The flow path 20 may be used to sample the slurry for an electrode in the mixing part 10. The flow path 20 may be provided to penetrate a lateral surface of the mixing part 10. The lateral surface of the mixing part 10 may mean a surface positioned in parallel with the gravitational direction, i.e., one of all the surfaces perpendicular to upper and lower surfaces of the mixing part 10.

The flow path 20 may transfer a small amount of slurry for an electrode, which is stored in the mixing part 10, to the weight measurement part 30. Further, the flow path 20 may transfer the slurry sample for an electrode, on which the weight measurement part 30 has completely performed the measurement, back to the mixing part 10. That is, the flow path 20 may extend from the lateral surface of the mixing part 10 to the weight measurement part 30. The flow path 20 may be provided as one or more flow paths 20.

Further, the flow path 20 may include one or more a conveyance screw and a pump.

In the embodiment, in case that the apparatus 100 for manufacturing slurry for an electrode according to the present invention has a single flow path 20, the flow path 20 may transfer the slurry for an electrode in two directions. Therefore, the conveyance screw and the pump included in the flow path 20 may transfer the slurry for an electrode in the two directions.

In another embodiment, in case that the apparatus 100 for manufacturing slurry for an electrode according to the present invention has two flow paths 20, one flow path 20 may transfer the slurry for an electrode from the mixing part 10 to the weight measurement part 30, and the other flow path 20 may transfer the slurry for an electrode from the weight measurement part 30 to the mixing part 10. In this case, the means of the two flow paths 20 for transferring the slurry for an electrode may be identical to each other as the conveyance screw or the pump or different from each other as a conveyance screw-pump or a pump-conveyance screw.

FIG. 3 is a cross-sectional view illustrating the weight measurement part 30 according to the embodiment of the present invention.

The weight measurement part 30 may measure a weight of a sample of the slurry for an electrode. The weight measurement part 30 may measure a weight of the sample by mounting the sample of the slurry for an electrode, which is transferred through the flow path 20, on a plate 32.

The weight measurement part 30 may measure one or more a weight of the sample supplied from the flow path 20 and a weight of the sample measured after the sample is dried. Therefore, the weight measurement part 30 may include a drying part 31.

The drying part 31 may dry the sample by supplying heat to the sample stored in the weight measurement part 30. The drying part 31 may dry the sample by raising a temperature in the weight measurement part 30. In this case, the drying part 31 may raise the internal temperature of the weight measurement part 30 to a temperature of 5° C. to 300° C. Particularly, the drying part 31 may raise the internal temperature of the weight measurement part 30 to a temperature of 20° C. to 200° C.

Alternatively, the drying part 31 may dry the sample by supplying high-temperature air to the sample stored in the weight measurement part 30. The drying part 31 may include: a heating part (not illustrated) configured to produce high-temperature air by heating air; and a spray part (not illustrated) configured to spray the high-temperature air to the sample and into the weight measurement part 30.

The weight measurement part 30 may calculate the percentage of a weight measured before the sample is dried and a weight measured after the sample is dried. Therefore, the weight measurement part 30 may calculate a ratio between a solid material and the solvent contained in the slurry for an electrode. In this case, the solid materials may include the electrode active material, the conductive material, and the binder. In this case, the calculation may be performed on the basis of ((weight measured before sample is dried)−(weight measured after sample is dried))/(weight measured before sample is dried)×100.

The percentage of weights before/after drying of the slurry for an electrode manufactured by the apparatus 100 for manufacturing slurry for an electrode according to the present invention may be 10% to 90%. In particular, the percentage of weights before/after drying of the slurry for an electrode may be 20% to 80%. When the percentage of weights before/after drying of the slurry for an electrode is less than 10%, a ratio of the solid material contained in the slurry for an electrode is high, which makes it difficult to perform control at the time of applying the slurry for an electrode onto a conductor during a subsequent process. When the percentage of weights before/after drying of the slurry for an electrode is more than 90%, a ratio of the solvent contained in the slurry for an electrode is high, which makes it difficult to manufacture the electrode with the high-performance.

The apparatus 100 for manufacturing slurry for an electrode may include a display part (not illustrated). The display part may display one or more of the weights of the sample measured and calculated by the weight measurement part 30 before and after the sample is dried and the percentage of the weights. A display device, which visually displays data used in the technical field, may be used as the display part. The display device is not particularly limited. For example, the display part may include an LCD, an LED, a touch screen, or the like.

The apparatus 100 for manufacturing slurry for an electrode may include any one or more an input part (not illustrated) and a control part (not illustrated).

The input part may allow a user to arbitrarily input the supply amount of the electrode active material, the conductive material, the binder, and the solvent and a mixing speed of the mixing part 10. Further, in case that the display part according to the present invention is provided as a touch screen, the display part may also serve as the input part.

The control part receives data related to one or more of the weight measured before the sample is dried, the weight measured after the sample is dried, and the percentage of the weights of the sample from the weight measurement part 30, and then the control part may automatically adjust the supply amount of the electrode active material, the conductive material, the binder, and the solvent and the mixing speed of the mixing part 10.

The control part may store reference values related to one or more of the weight measured before the sample is dried, the weight measured after the sample is dried, and the percentage of the weights of the sample. The control part may compare the data transmitted from the weight measurement part 30 with a pre-stored reference value and control the supply amount of the electrode active material, the conductive material, the binder, and the solvent and the mixing speed of the mixing part 10.

For example, the control part may increase the supply amount of the solvent when a percentage reference value of the sample weight of 40% to 80% is stored, and the percentage of the sample weights measured and calculated by the weight measurement part 30 is 20%.

FIG. 4 is a side view illustrating an apparatus 100 for manufacturing slurry for an electrode according to another embodiment of the present invention.

The apparatus 100 for manufacturing slurry for an electrode may have a plurality of flow paths 20 provided along a height of the mixing part 10. Further, the apparatus 100 for manufacturing slurry for an electrode may have a plurality of weight measurement parts 30 provided to be stacked. In the apparatus 100 for manufacturing slurry for an electrode, the flow paths 20 may correspond in number to the weight measurement parts 30. The plurality of flow paths 20 may be connected to the single weight measurement part 30. That is, the flow paths 20 may extract the samples of the slurry for an electrode in accordance with the heights of the mixing part 10. The weight measurement part 30 may measure the weights of the slurry for an electrode in accordance with the heights of the mixing part 10.

In this case, in case that there is a deviation between the weight measured before the sample is dried, the weight measured after the sample is dried, and the percentage of the weights of the sample measured by the plurality of weight measurement parts 30, the control part determines that the mixtures of the slurry for an electrode are not uniform in accordance with the heights of the mixing part 10, and then the control part may control the mixing speed of the mixing part 10.

The washing part 40 may wash the interior of the weight measurement part 30. The washing part 40 may wash the weight measurement part 30 while spraying a washing liquid and air. The washing part 40 may detach the solid material remaining on the weight measurement part 30 by spraying the washing liquid and air at a high pressure. Further, the washing liquid sprayed from the washing part 40 may contain the material identical to the solvent contained in the slurry for an electrode.

The washing part 40 may include: a movement pipe (not illustrated) configured to receive the washing liquid or air and move the washing liquid or air; and a spray nozzle (not illustrated) configured to receive the washing liquid or air from the movement pipe and spray the washing liquid to one or more of the weight measurement part 30 and the plate. The spray nozzle may be provided as one or more spray nozzles. The spray nozzle may penetrate and be coupled to an outer surface of the movement pipe.

In case that the washing part 40 is configured to wash the weight measurement part 30 or the plate by using the washing liquid, the washing part 40 may further include an air supply part (not illustrated). The air supply part may supply air to the movement pipe, thereby allowing a high-pressure liquid to be sprayed through the spray nozzle.

In the apparatus 100 for manufacturing slurry for an electrode according to the present invention, the washing part 40 may further include a hot-air drying part (not illustrated) to reduce an error caused when the weight measurement part 30 measures the weight of the solid material. The hot-air drying part may evaporate the liquid by supplying heated air to the weight measurement part 30.

The apparatus 100 for manufacturing slurry for an electrode according to the present invention may further include a plate storage part (not illustrated).

The plate storage part may store a plurality of plates. The plate storage part may be positioned at one side of the weight measurement part 30 and supply the plate into the weight measurement part 30 or replace the plate. Therefore, the plate storage part and the weight measurement part 30 may each include a through port at one side so that the plate may move. The through port of the plate storage part and the through port of the weight measurement part 30 may correspond in size and position to each other.

Further, the through port may include an opening/closing part, and the opening/closing part may operate in conjunction with the washing part 40. Therefore, the opening/closing part is closed when the weight measurement part 30 measures the weight of the slurry sample for an electrode. The opening/closing part is opened to replace the plate before or after the washing part 40 washes the interior of the weight measurement part 30 or when the washing part 40 washes the interior of the weight measurement part 30 after the measurement of the weight is completed.

The gas discharge part 50 may circulate the air in the weight measurement part 30. The gas discharge part 50 may lower a temperature in the weight measurement part 30 by discharging the high-pressure air, which is sprayed from the washing part 40, to the outside or discharging the heated air to the outside by the hot-air drying part. Further, the gas discharge part 50 may discharge the residual solid material, which is detached by the washing part 40, to the outside.

In the embodiment, the gas discharge part 50 may be coupled, in the form of a hollow pipe, to one surface of the weight measurement part 30. Further, the gas discharge part 50 may include a blower fan (not illustrated) configured to discharge air in the weight measurement part 30 to the outside.

In case that the apparatus 100 for manufacturing slurry for an electrode according to the present invention includes a plurality of weight measurement parts 30, the gas discharge part 50 may be provided for each of the weight measurement part 30.

Further, the apparatus 100 for manufacturing slurry for an electrode according to the present invention may further include an opening/closing part (not illustrated) between the weight measurement part 30 and the gas discharge part 50. When the weight measurement part 30 measures the weight of the slurry for an electrode or the solid material, the opening/closing part is closed to prevent the air in the weight measurement part 30 from being discharged to the outside. Further, after the washing part 40 washes the weight measurement part 30 or the plate, the opening/closing part is opened, such that the air may be discharged to the outside. The opening/closing part may be controlled by the control part.

A method of manufacturing slurry for an electrode according to the embodiment of the present invention may include step S10 of manufacturing the slurry for an electrode, step S20 of measuring the weight of the slurry sample for an electrode, and step S30 of washing the weight measurement part.

Step S10 of manufacturing the slurry for an electrode may include manufacturing the slurry for an electrode by mixing the electrode active material, the conductive material, the binder, and the solvent.

The conductive material is not particularly limited as long as the conductive material has conductivity without causing a chemical change in battery. Representative examples of the conductive material may include one material selected from a group consisting of natural graphite, artificial graphite, carbon black, acetylene black, Ketjen black, channel black, furnace black, lamp black, thermal black, carbon fiber, metal fiber, fluorocarbon, aluminum, nickel powder, zinc oxide, potassium titanate, titanium oxide, and polyphenylene derivative, or a mixture of two or more of the above-mentioned material.

As the binder, there may be used various types of binder polymers such as polyvinylidenefluoride-hexafluoropropylene copolymer (PVDF-co-HFP), polyvinylidenefluoride, polyacrylonitrile, polymethylmethacrylate, polyvinylpyrrolidone, tetrafluoroethylene, polyethylene, polypropylene, polyacrylic acid, ethylene-propylene-diene monomer (EPDM), sulfonated EPDM, styrene butadiene rubber (SBR), fluorine rubber, polyacrylic acid, and polymers made by substituting hydrogen of the above-mentioned material with Li, Na, Ca, or the like, or various copolymers.

The solvent may contain any one of N-methylpyrrolidone (NMP), dimethylisosorbide (DMI), dimethyl sulfoxide (DMSO), and methyl sulfoxide.

Step S20 of measuring the weight of the slurry sample for an electrode may include sampling, by the weight measurement part, the slurry for an electrode, and measuring a weight of the slurry sample for an electrode.

Step S20 of measuring the weight of the slurry sample for an electrode may include step S21 of sampling the slurry for an electrode and then measuring a weight of the sampled slurry for an electrode, and step S22 of drying the slurry sample for an electrode and then measuring a weight of the dried slurry sample for an electrode. Step S20 of measuring the weight of the slurry sample for an electrode may include inspecting quality of the slurry for an electrode by measuring the amount of the electrode active material contained in the slurry for an electrode.

That is, step S20 of measuring the weight of the slurry sample for an electrode may include measuring the weights measured before and after the slurry sample for an electrode is dried, and computing whether a value of the amount of the electrode active material contained in the slurry for an electrode is a pre-stored reference value or more.

For example, step S20 of measuring the weight of the slurry sample for an electrode may include measuring the weights measured before and after the slurry sample for an electrode is dried, and decreasing the supply amount of the binder or solvent for an electrode to the mixing part or increasing the supply amount of the electrode active material when the amount of the electrode active material in the slurry for an electrode is calculated as being less than 95 wt %.

Step S30 of washing the weight measurement part may include washing the weight measurement part after removing the slurry sample for an electrode on which the measurement is completely performed.

In this case, the slurry sample for an electrode may be discharged and discarded or resupplied to the mixing part through the flow path.

Step S30 of washing the weight measurement part may include step S31 of spraying one or more a washing liquid and air to the inner wall of the weight measurement part, and step S32 of discharging one or more the washing liquid and air, which have been used to wash the inner wall of the weight measurement part, to the outside. In this case, the washing liquid and air may be sprayed at a high pressure.

In case that the washing liquid is used in step S30 of washing the weight measurement part, step S30 of washing the weight measurement part may include step S31-1 of drying the interior of the weight measurement part, and step S32-1 of discharging the evaporated washing liquid to the outside.

Further, in case that the slurry for an electrode remaining in the weight measurement part is removed by the sprayed air in step S30 of washing the weight measurement part, step S30 of washing the weight measurement part may include step S32-2 of discharging the air, which has been used for washing, and the residual slurry for an electrode, which is detached by the air, to the outside of the weight measurement part.

Step S30 of washing the weight measurement part may include washing the weight measurement part by spraying one or more the washing liquid and air to the plate included in the weight measurement part and configured to mount the slurry sample for an electrode, or washing the weight measurement part by replacing the plate.

While the present invention has been described above with reference to the exemplary embodiments, it may be understood by those skilled in the art that the present invention may be variously modified and changed without departing from the spirit and scope of the present invention disclosed in the claims.

The invention claimed is:

1. An apparatus for manufacturing a slurry for an electrode, the apparatus comprising:

a mixer configured to mix an electrode active material, a conductive material, a binder, and a solvent to form the slurry;

a flow path configured to sample the slurry from the mixer to provide a sample;

a weigher configured to measure a weight sample;

a washer configured to wash an interior of the weigher; and a gas discharger configured to circulate air in the weigher, wherein the flow path is provided as a plurality paths provided at different heights of the mixer, and each of the flow paths moves a corresponding sample of the slurry to the weigher, and wherein the weigher is provided as one or more stacked weighers, and each of the weighers is configured to measure the weight of the corresponding sample supplied from each of the flow paths.

2. The apparatus of claim 1, wherein the weigher comprises a plate configured to mount the sample.

3. The apparatus of claim 2, further comprising a plate storage part positioned at one side of the weigher and configured to store a plurality of plates, the plate storage part being configured to supply the plate to the weigher and replace the plate.

4. The apparatus of claim 1, wherein the weigher comprises a dryer configured to dry the sample by supplying heat to the sample.

5. The apparatus of claim 4, wherein the weigher is configured to measure a weight of the sample before the sample is dried and a weight of the sample after the sample is dried.

6. The apparatus of claim 5, further comprising a display configured to display one or more of the weight of the sample measured before the sample is dried, the weight of the sample measured after the sample is dried, and a percentage of the weights of the sample measured before and after the sample is dried.

7. The apparatus of claim 1, wherein the flow path is configured to move the slurry to the weigher by any one of a conveyance screw and a pump.

8. The apparatus of claim 1, further comprising a controller configured to:

store a reference value related to the weight of the sample; and when the weight of the sample measured by the weigher is less than the reference value, adjust one or more of a supply amount of one or more of the electrode active material, the conductive material, the binder, and the solvent to the mixer and a mixing speed of the mixer.

9. The apparatus of claim 1, wherein the washer is configured to wash the weigher by spraying one or more of a washing liquid and air into the weigher.

10. The apparatus of claim 9, wherein the washer is configured to spray washing liquid, and wherein the apparatus further comprises a hot-air dryer configured to evaporate the washing liquid by supplying heated air to the weigher.

11. A method of manufacturing a slurry for an electrode using the apparatus of claim 1, the method comprising:

preparing the slurry by mixing an electrode active material, a conductive material, a binder, and a solvent;

sampling the slurry to obtain a sample;

measuring a weight of the sample by a weigher;

removing the sample from the weigher; and washing the weigher.

12. The method of claim 11, wherein the measuring of the weight comprises drying the sample and measuring the weight of the dried sample.

13. The method of claim 11, wherein the washing of the weigher comprises:

spraying one or more of a washing liquid and air to an inner wall of the weigher; and discharging the one or more the washing liquid and air, which have been used to wash the inner wall of the weigher, to outside the weigher.

14. The method of claim 11, wherein the washing of the weigher comprises spraying one or more of a washing liquid and air to a plate included in the weigher.

15. The method of claim 11, wherein the washing of weigher comprises replacing a plate included in the weigher.

* * * * *